United States Patent [19] [11] 4,195,114
Crosby et al. [45] Mar. 25, 1980

[54] CONDUCTIVE PLASTIC AND METHOD OF PREPARATION

[75] Inventors: Edward G. Crosby, Marlboro, N.Y.; James E. Henning, Pampano Beach, Fla.; Frederick C. Hornbeck, Wappingers Falls, N.Y.

[73] Assignee: International Business Machines Corporation, Armonk, N.Y.

[21] Appl. No.: 941,701

[22] Filed: Sep. 12, 1978

Related U.S. Application Data

[63] Continuation of Ser. No. 754,939, Dec. 28, 1976, abandoned, which is a continuation-in-part of Ser. No. 609,658, Sep. 2, 1975, abandoned.

[51] Int. Cl.$^2$ .................. B32B 15/00; B32B 17/00; D02G 3/00
[52] U.S. Cl. .................. 428/404; 428/373; 428/378; 428/388; 428/403; 428/407
[58] Field of Search .............. 428/404, 403, 406, 364, 428/372, 357, 359, 361, 388, 380, 381, 375, 407, 373, 374, 378

[56] References Cited

U.S. PATENT DOCUMENTS

| | | | |
|---|---|---|---|
| 2,849,338 | 8/1958 | Whitehurst et al. | 428/388 |
| 2,979,424 | 4/1961 | Whitehurst et al. | 428/388 X |
| 3,148,107 | 9/1964 | Selke et al. | 428/375 X |
| 3,403,069 | 9/1968 | Benson | 428/361 X |
| 3,709,773 | 1/1973 | Hall | 428/375 |

FOREIGN PATENT DOCUMENTS 1531272  6/1968  France .

Primary Examiner—Lorraine T. Kendell
Attorney, Agent, or Firm—W. S. Robertson

[57] ABSTRACT

A new plastic-metal composite material and method of preparing the material is disclosed. Fibers that are coated with metal form a matrix in the plastic that gives the composite material sufficient electrical and thermal conductivity for many applications. In a preferred embodiment of the new method of this invention, metal is formed on glass fibers by vacuum deposition and the metal coated fibers are combined with a selected plastic in a pellet form that is suitable for injection molding operations.

5 Claims, 1 Drawing Figure

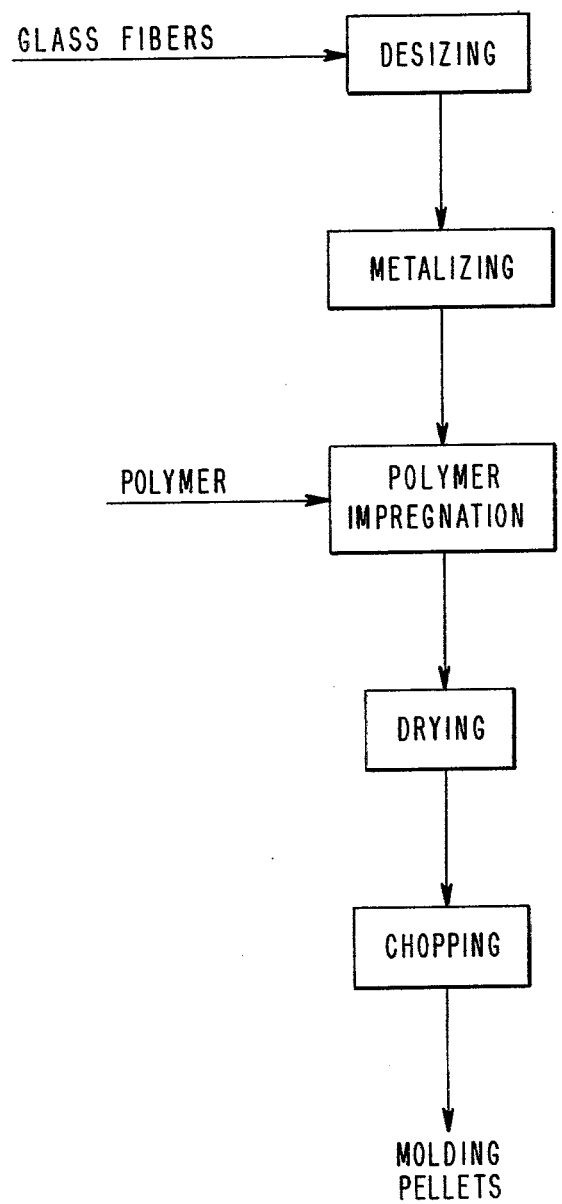

# CONDUCTIVE PLASTIC AND METHOD OF PREPARATION

RELATED APPLICATIONS

This is a continuation of application Ser. No. 754,939 filed Dec. 28, 1976, now abandoned, which in turn is a continuation-in-part of our application Ser. No. 609,658, "Conductive Plastic and Method Of Preparation", filed Sept. 2, 1975, and now abandoned.

Application Ser. No. 558,759 of Edward G. Crosby and Frederick C. Hornbeck, entitled "Conductive Plastic", filed Mar. 17, 1975, now abandoned, and assigned to the assignee of this invention, describes other developments in metal-plastic composite materials.

INTRODUCTION

There are many applications where plastics have recognized advantages over their metal counterparts except for the fact that the plastics ordinarily lack the conductivity (electrical and/or thermal) of metal components. For example, the structural covers for components of a data processing system might advantageously be molded of plastic except that these parts must be electrically conductive to shield the components from electromagnetic radiation. When these parts are made of plastic, it is customary to provide some separate means for shielding the electronic components. For example, the electronic components can be enclosed in an inner metal structure for shielding, or the plastic covers can be given a coating of conductive paint. These extra steps detract from the ease of manufacture of plastics as compared with metals in other applications. Other applications for a conductive plastic are in low temperature resistance heater elements. Similarly there are applications for molded plastic heat sinks and other devices that require heat transfer characteristics that are much higher than the normal characteristics of plastics. In addition to providing improved manufacturing characteristics, plastics have other characteristics, such as flexibility, that may be advantageously combined with conductivity in many applications.

As an alternative to the multi-step manufacturing processes that are described in the last paragraph, the prior art has suggested loading the plastic with metal fillers that provide conductivity. For example, the plastic can be loaded with small metal particles in a variety of shapes that provide conductivity to the extent that they provide a more or less continuous path through the material. This invention provides a new and improved composite metal-plastic.

THE INVENTION

One object of this invention is to provide an improved metal-plastic composite material that has relatively long metal fibers that increase the number of electrical contact points in the matrix and thereby increase the conductivity of the material. Another object is to limit the amount of metal that is loaded into the plastic so as to preserve the desirable properties of the plastic and to preserve the advantageous features of conventional processes for handling and molding plastics.

According to this invention, fibers of a suitable material such as glass are given a metal coating and are combined with the plastic. In a preferred embodiment of the invention, the plastic and metal coated fibers are first produced in pellet form that is of the size conventionally used for subsequent injection molding operations.

The following detailed description of two specific embodiments of the invention will suggest other features and objects of the invention.

THE DRAWING

The drawing is a flow diagram of a process of producing an improved metal-plastic material according to this invention.

THE METHOD AND COMPOSITE MATERIAL OF THE DRAWING

Introduction

The drawing shows a sequence of discrete steps that have been used for the limited scale production and for testing of the new metal-plastic material of this invention. The materials and apparatus will be described as they appear in the sequence of this flow chart. Afterwards, a continuous process and other contemplated variations of this specific system will be described in a separate section of this specification.

Glass Fiber Preparation

Glass fibers are often used with plastics of various kinds to give added strength to the composite glass-plastic material, and the use of glass fibers is well known. See pages 98–102 of *Practical Guide to Plastics Applications* by E. G. Crosby and S. N. Kochis, published by Cahners Publishing Co., Inc.

In the method of the drawing, a fluff of randomly oriented, continuous, glass fibers (conventionally called "surfacing mat") is used. The surfacing mat is laid out in a thin layer (about 0.010 inches thick) and is located between two strips of loosely woven glass cloth which provide mechanical support for the surfacing mat. Conventionally, the surfacing mat is supplied with a sizing that gives the glass fibers the mechanical support that is necessary for handling during processing, and in one step of the operation this sizing is removed. Heating the glass fibers in an oven at 1000° F. for about 20 minutes satisfactorily removes the sizing. The sandwich of surfacing mat and glass fiber cloth strips is then wound onto a roll for the next processing step.

Metallizing

The roll of surfacing mat and supporting glass cloth strips, is placed in a vacuum chamber of a vacuum deposition apparatus and arranged to be wound onto a takeup reel during the vacuum deposition step. The takeup reel and the supply reel are located to one side of the chamber and an idler roller is located on the opposite side of the chamber so that the material makes two passes across the evaporation source. In the two passes, the surfacing mat receives evaporated metal from the two opposite sides of the sandwich of mat and glass cloth strips. The weave of the glass fiber cloth is sufficiently open (about 20 threads per foot) and the packing of the surfacing mat is loose enough and thin enough that both of these surfaces of the mat receive metal by deposition. The metallized mat is removed from between the two glass cloth strips at this point in the process. The cloth layers may be discarded at the end of a metallizing operation, but it is contemplated that a reusable metal mesh support may be substituted for the woven glass cloth.

Any metal is much more conductive than a plastic or than a composite metal-plastic, and the choice of a particular metal for the composite does not significantly affect the conductivity of the composite. However, there are other considerations that make some metals preferable to others for a particular application, as the following examples illustrate.

1. The metal should adhere well to the glass fibers. Chromium was found to adhere well but to produce stresses that destroyed the glass fibers. Aluminum was found to have relatively poor adhesion and copper was found to have medium adhesion. Zinc for example was found to form a porous coating that lacked continuity and thereby produced a higher electrical resistance than is desirable for most applications. Nickel and titanium were found to have good adhesion to the glass fibers and to have other desirable properties.

2. The metal and the plastic should adhere well. The metals tested has satisfactory adhesion to the plastic.

3. The metal must not have an adverse chemical reaction with the plastic. None of the metals tested produced an adverse chemical reaction with the plastic, but an adverse reaction might be expected to occur in berylium-copper for example. Metal plating on plastic is a well developed art. See *Metallizing of Plastics* by H. Narcus, published 1960 by Reinhold Publishing Corp. It is contemplated that a wide variety of metals and alloys may be used in this invention and will provide results that are satisfactory from the standpoint of the usual tests that are applied to composites of plastics and unmetallized glass fibers and from the standpoint of the electrical or thermal conductivity tests that are selected for a particular application of a conductive plastic.

Impregnating the Plastic

In one example of the process that is illustrated in the drawing, the plastic is a polycarbonate that is sold under the trademark LEXAN. The conventional techniques of molding glass fibers in plastics are used with a wide variety of plastics and it is contemplated that the invention will be useful with a similar variety of plastics.

The metallized fiber is combined with the plastic in a way that provides for dispersing the plated glass fibers throughout selected regions of the molded product and also preserves the metal plating on the glass fibers. (For example conventional milling destroys the glass fibers.) In the method of the drawing, the polycarbonate plastic is dissolved in a conventional solvent (for example methylene chloride) and the solution is sprayed onto the metallized fibers. The sprayed fibers are dried in air to evaporate the solvent and to produce a solid mass of polycarbonate-metallized fiber composite.

The proportion of metallized fibers in the plastic can be varied readily, as is conventionally done with unmetallized glass fibers fillers, to provide suitable electrical and/or thermal conductivity and to provide other, conventional, properties of the plastic.

Forming Plastic Pellets

The technique that is described in the preceding paragraph for combining glass fibers and plastic is conventional for known manufacturing processss using unmetallized fibers, and the process may be stopped at this point with a molded plastic body having enhanced conductivity. For many other applications it is desirable to further process the plastic mass into flakes that are about one quarter of an inch across. (This corresponds to the size of pellets of plastic that are commercially available for use in injection molders.) The chopping is performed by hand or by suitable known commercial choppers. This operation gives the metal fibers random lengths averaging one quarter of an inch. A fiber length in this general range provides good electrical and thermal conductivity and it does not adversely increase the viscosity of the plastic in the injection molding process.

The pellets that are produced with the chopping step correspond to the normal end product of the suppliers of plastic materials and the pellets are particularly advantageous for subsequent extrusion and injection molding of thermoplastic foam and thermoplastic nonfoam materials. In an injection molding process the pellets are melted and mixed and the metallized fibers remain distributed throughout the mass of the molded product with a suitable form to provide continuity.

OTHER EMBODIMENTS OF THE INVENTION

A Continuous Process

The method that is illustrated in the drawing is useful for making small amounts of the metal-plastic composite and it is readily adaptable to a continuous process for large volume production. Glass fibers are conventionally manufactured in a continuous process in which melted glass is held in a reservoir and is allowed to flow through a number of downwardly directed orifices. As the glass flows downwardly, it cools to form the glass fibers which are wound on a rotating reel. At a suitable point in this descending column of glass fibers, the glass fibers are sprayed with a sizing. This conventional step is omitted in the process of this invention.

The glass fibers in this descending column can be metallized by a technique called flame spraying. Thereafter the metallized glass fibers are led through the extrusion orifice of an apparatus to extrude plastic, to a diameter of about one eighth of an inch and the extruded plastic containing the glass fibers is cooled and chopped in the pellets about one quarter of an inch in length. (This is a conventional technique for forming plastic pellets containing unmetallized glass fibers except that the pellets are longer than conventional pellets.)

Other Materials Systems

The two examples of the process of this invention will suggest a wide variety of variations in particular steps and in materials. For example, glass fibers have been widely used because they give desirable properties to the composite fiber-plastic material, but it is contemplated that the function of supporting the metal coatings can be provided by other dielectric, metallizable, fibers.

Injection molding, compression molding, transfer molding of thermoset materials with metalized dielectric fibers is useful for many applications. For example, heat sinks are advantageously molded by these techniques. Some covers and enclosures that are often molded by these techniques need only sufficient electrical conductivity to prevent these parts from building up an electric charge (the associated discharge produces electromagnetic interference); this requirement for conductivity is ordinarily less than the requirement for electrical shielding. Molding of glass reinforced polyesters and molding of flexible and rigid skinned reinforced urethanes is useful in many applications where metal coated fibers provide thermal or electrical conductivity. Molding and extrusion of glass reinforced flexible and rigid thermoplastic and elastomer materials and coatings, for example, tires and coatings for cables, is another useful application for this invention.

Casting, potting and encapsulation of glass reinforced epoxy systems with the metal coated fibers is also useful, for example in packaging a power transistor.

A FURTHER EXAMPLE

Glass Metalizing

Glass fibers are conventionally metalized with aluminum to be used as radar chaff. This product has been modified for use in the composite material of this invention. (The fact that poor adhesion of aluminum and glass fibers was achieved by vacuum deposition is attributed to moisture on the glass fibers.)

In the conventional process for forming aluminized glass fibers, strands of glass are drawn from a melt of glass through bushings that form about 20 to 35 strands. The strands are pulled from the melt and are passed across the meniscus of a melt of aluminum where they pick up a coating of aluminum. The aluminized fibers are then formed into a yarn and wound onto a spool. For use in a conductive plastic, this material is made without its usual slip coating and it is made in the thickness range that is conventional for glass fiber reinforcement for plastics. Other modifications will be discussed separately.

Combining The Metalized Glass And Plastic

We have found poor results in combining metalized glass fibers and plastic molding materials by the technique of dry blending that is often used with conventional, unmetalized, glasss fibers. (In dry blending, unmetalized glass fibers and plastic molding materials are separately fed into an extrusion apparatus that heats and mixes the materials to distribute the glass fibers through the melted plastic in preparation for a pellet manufacturing operation.) The metalized glass fibers are difficult to handle because they tend to float in the air around the work station. In addition, the metalized glass has poor wetting to the melted plastic. When poor wetting occurs the plastic has poor physical properties, as may also occur with plastics containing unmetalized glass fibers. Additionally, if the fibers are not wet by the plastic, the fibers do not mix with the plastic and disburse through the materials but instead they tend to clump so that the resulting molded material has poor shielding qualities.

The success with the method that is shown in the drawing is attributed to the fact that the dissolved plastic readily wets the metalized glass fibers. This technique is readily adaptable to a continuous process by applying a suitable binder coating to the metalized glass fibers. As in the previous example, a thin coating of polycarbonate dissolved in methylene chloride can be applied to the metalized glass fibers and the methylene chloride is then evaporated to prepare the metalized glass fibers for incorporation in pellets of polycarbonate plastic. Suitable solvents for other plastics are well known for depositing a plastic from a liquid phase.

Preferably, the conventional process for aluminizing glass fibers is modified by coating the metalized glass fibers with a binder such as a thin plastic coating after the aluminizing step and before the strands are wound onto a spool. Suitable coating apparatus is well known and typically comprises a roller that is located partially in a container of the binder material so that the roller carries a film of the binder on its surface. The 25-35 strands of metalized glass are passed over the top of the roller sufficiently spaced apart that each strand is individually coated. The subsequent step of gathering the strands to form a yarn that is wound onto the spool, causes the strands to be held in a yarn when the solvent evaporates.

The molded pellets that are formed according to this invention have a suitable number of strands of metalized glass as a core within a pellet. Preferably the pellets are made with as many strands as possible without regard to the ratio of metalized glass fibers to plastic in the final molded article, and the ratio of metalized glass to plastic for a particular product is varied by combining suitable proportions of pellets containing metalized glass fibers with conventional molding pellets which may contain unmetalized glass fiber or may be without fibers. We have found that when too many fibers are combined in a pellet, the individual fibers do not wet to the plastic of the pellets and loose fibers can be observed at the ends of the pellets. These loose fibers remain unattached to the plastic in subsequent molding of the final article. When too few fibers are contained in a pellet, the plastic and glass fiber combination is not strong enough for the pull that is imparted to the extrusion in a step of the pellet manufacturing process that will be described later. As an example, we have found that pellets containing about 500 fibers had poor strength, that pellets containing about 1000 fibers produced poor wetting, and that pellets containing about 750 fibers had good strength and good wetting.

In this example, spools each containing a yarn of 25 to 35 strands of metalized glass fibers were mounted on a conventional creeling machine and combined to form a roving of about 750 strands. Preferably the roving is given a thin plastic coating (in the way already described) to hold the yarns together for easier handling and for better feed through the pellet extruder. The roving of this example was about 1/16 inch wide and generally oval in cross section.

Plastic Pellet Manufacture

The general method and apparatus for forming pellets that have a central core of metalized glass fibers is similar to the conventional method and apparatus for forming pellets containing unmetalized glass. In one conventional process for making pellets of unmetalized glass that has been used advantageously, a plastic extruder receives a continuous roving of glass fibers and a supply of a thermoplastic. The plastic is melted in the extruder and is extruded with the glass roving intact and forming a core of the extrusion. The extrusion is typically about ⅛-¼ of an inch in diameter and it is chopped into suitable lengths to form pellets. In section the pellets are any one of various shapes including round, oval, and rectangular.

It is an important feature of our preferred pellet and the associated method that the metalized glass fibers are not cut until they are molded with a surrounding body of plastic in pellet form. When the metalized glass fibers are otherwise cut, the metal coating is often damaged at the ends of the fiber where the cut is made. The splintered coating has stress points where further breaking is likely to occur during subsequent processing, and the cut fibers contain an undesirable dust of crushed glass and fragments of the metal coating. When the pellets are chopped, the plastic appears to support the fibers in a way somewhat analogous to microtome sectioning of biological specimens so that the metal coating on the fibers is not seriously damaged in the region of the cut.

Pellet Length

The significance of pellet length can be explained in relation to the following table.

| Sample | A | B | C | D | E |
|---|---|---|---|---|---|
| Pellet length | ⅛" | ¼" | ⅜" | ½" | ¾" |
| Final Fiber length | — | .008" to .012" | 3/64" | 3/16" | 3/16" |

Samples A and B were formed from pellets having pre-cut fibers. Sample B was also formed from pellets having a core of metalized glass fibers, and samples C, D and E were formed from pellets having a core of glass fibers. It can be seen that in all cases the operation of injection molding a final article broke the metalized glass fibers into shorter lengths than the original length of the fiber and molding pellet. This effect is attributed to the mixing action that takes place in an injection molding apparatus (and is desirable for getting a good distribution of the metalized glass fibers through the final molded article.) Evidently the fibers are broken further throughout this process and the length of time that is required for effective mixing in an injection molding press does not produce excessive breakage if the initial fiber length is about ¾", preferably about ½". It is desirable to keep the fibers as long as possible in order to improve the conductivity of the molded product. Samples A and B did not provide suitable conductivity; sample C had useful conductivity; and sample D and E had improved conductivity. Pellets longer than ¾" are likely to be difficult to handle in convetional molding apparatus.

Metalized Glass Fiber Density

The density of conventional unmetalized glass fibers in plastics is usually specified by the weight of the glass fibers as a percentage of the weight of both the glass fibers and the plastic. The metal coating of the glass fibers of our composite material is very small in relation to the weight of the fibers themselves or the plastic and the ratios in the following examples can be satisfactorily compared with familiar ratios for conventional unmetalized glass re-enforced plastics. These conventional plastics are commonly made with up to 50% by weight of glass fiber re-enforcement. We have found that metalized glass fibers can be combined with plastic up to about 43% by weight but that the composite material becomes brittle as the weight is increased further. (Additional unmetalized glass fibers can be combined with 43% metalized glass fibers.) In response to other standard tests for plastics, the composite material performed like otherwise comparable glass re-enforced plastics. The composite material is electrically resistive when the amount of the metalized glass fibers is in the range of 12–15% and it is useful in electrical resistor applications already described. Generally the conductivity improved as the percent of metalized glass was increased.

These pellets have about 50% by weight of metalized glass, and it is desirable to combine these pellets with pellets not containing glass fibers in molding an article of about 43% or less metalized glass. Pellets can be molded with the selected weight percent of metalized glass of the molded article (for example, 43% or less) by reducing the number of strands in the roving or by increasing the cross sectional area of the pellet extrusion. Articles molded of a combination of these pellets and other pellets not containing metalized glass fibers also provide optimum conductivity and physical properties when the weight percent of metalized glass is about 25%. There are also applications for these conductive plastics in which shielding is not required and only minimal conductivity is needed (for example, minimal conductivity for electrostatic painting.)

Plastic pellets containing metalized glass fibers have been used successfully for injection molding both solid and foam objects. Conventional unmetalized glass fibers are molded with a variety of molding techniques, and we contemplate that the techniques discussed in this section of the specification will be useful with related materials and techniques, as has been explained already.

Tensile Strength

The reduced tensile strength of the aluminized glass fibers as compared with unmetalized fibers is attributed to brittle oxides that form on the aluminum. The tensile strength can be improved in several ways. Aluminum can be alloyed with various metals such as 2–3% antimony to inhibit the oxide formation, as is well known. The glass fibers can be aluminized over only about ¾ of their circumference. (Conventionally the fibers are coated only over ¾ of their circumference by passage across the aluminum meniscus and a reheat step causes the aluminum to spread around the entire circumference of the fiber. This reheat step is omitted.)

The Molded Article

Articles molded in this example have had good electromagnetic shielding (over 20 decibels minimum attenuation) over the ranges of 0 to 100 megahertz and 200–1000 megahertz. There are many applications for shielding in these ranges. The shielding mechanism is not fully understood but it is believed to be related to the length of the metalized fibers. We contemplate that composite materials having a full spectrum of shielding will be produced according to the method we have described.

Other Materials and Methods

The description of a preferred method of manufacturing molding pellets has been based on polycarbonate plastic and can be readily applied to other plastics. The metalized glass fibers constructed according to this section of the specification can be used with other plastics (urethanes, elastomers, thermo sets), as has been explained earlier.

From the description of these specific examples, those skilled in the various arts that apply to this invention will recognize many useful variations within the spirit of the invention and the scope of the claims.

What is claimed is:

1. A plastic molding pellet comprising,
   a core, in the form of at least one roving of metalized glass fibers, and
   a surrounding body of a thermoplastic enclosing the glass fibers individually,
   said body and said core being substantially equal in length and of a length to produce fibers averaging at least three-sixteenths of an inch in length in an article molded from the pellets,
   said core having a sufficient number of metalized glass fibers to give a subsequently molded article a useful value of electrical conductivity, and said body having a width sufficient to produce a weight percent of metalized glass fibers in the pellet in the range of 10 to 50 percent,
wherein said core of glass fibers comprises about 750 glass fibers.

2. The plastic molding pellet of claim 1 wherein the pellet is about one-half inch in length.

3. The plastic molding pellet of claim 2 wherein the pellet comprises about 50% by weight of the metalized glass fibers.

4. A plastic molding pellet comprising,
a core in the form of at least one roving of metalized glass fibers and a surrounding body of a thermoplastic,
said surrounding thermoplastic body and said core being substantially equal in length and of a length to produce fibers averaging at least three-sixteenth of an inch in length in a subsequently molded article,
said core having a number of fibers in relation to the width of the pellet to produce a weight percent of metalized glass fibers in the pellet in the range of 10 to 50 percent to provide a useful level of electrical conductivity in a subsequently molded article, the number of fibers being limited to a value to permit the thermoplastic of the surrounding body to enclose substantially all of the fibers individually to prevent loose, unwetted, fibers in the pellet and in a subsequently molded article.

5. A plastic molding pellet comprising,
a core in the form of at least one roving of metalized glass fibers and a surrounding body of a thermoplastic,
each of said glass fibers being metalized over at least part of its circumference,
said surrounding thermoplastic body and said core being substantially equal in length and of a length to produce fibers averaging at least three-sixteenth of an inch in length in a subsequently molded article,
said core having a number of fibers in relation to the width of the pellet to produce a weight percent of metalized glass fibers in the pellet in the range of 10 to 50 percent to provide a useful level of electrical conductivity in a subsequently molded article, said number of fibers corresponding to 750 fibers in a pellet having a diameter of one-eighth inch to one-quarter inch, the number of fibers being limited to a value to permit the thermoplastic of the surrounding body to enclose substantially all of the fibers individually to prevent loose, unwetted, fibers in the pellet and in subsequently molded article and sufficiently to limit initial damage at the ends of the metal coating of the fibers during pellet manufacturing and consequent damage in subsequently molding an article.

* * * * *

UNITED STATES PATENT AND TRADEMARK OFFICE
CERTIFICATE OF CORRECTION

PATENT NO. : 4,195,114
DATED : March 25, 1980
INVENTOR(S) : Edward G. Crosby et al.

It is certified that error appears in the above-identified patent and that said Letters Patent are hereby corrected as shown below:

On the title page, item 73, "Assignee: International Business Machines Corporation, Armonk, N.Y." should read:

--Assignees: International Business Machines Corporation, Armonk, N.Y. and

Lundy Electronics & Systems, Inc.

Pompano Beach, Florida part interest each.

Signed and Sealed this

Twenty-ninth Day of July 1980

[SEAL]

Attest:

SIDNEY A. DIAMOND

Attesting Officer

Commissioner of Patents and Trademarks